United States Patent
Freitag et al.

(10) Patent No.: US 7,466,524 B2
(45) Date of Patent: *Dec. 16, 2008

(54) SELF-PINNED SPIN VALVE SENSOR HAVING ITS FIRST AP PINNED LAYER THICKER THAN ITS SECOND AP PINNED LAYER TO REDUCE THE LIKELIHOOD OF AMPLITUDE FLIP

(75) Inventors: James Mac Freitag, Sunnyvale, CA (US); Hardayal Singh Gill, Palo Alto, CA (US); Jih-Shiuan Luo, Sunnyvale, CA (US); Mustafa Michael Pinarbasi, Morgan Hill, CA (US)

(73) Assignee: Hitachi Global Storage Technologies Netherlands B.V., Amsterdam (NL)

( * ) Notice: Subject to any disclaimer, the term of this patent is extended or adjusted under 35 U.S.C. 154(b) by 0 days.

This patent is subject to a terminal disclaimer.

(21) Appl. No.: 11/301,877

(22) Filed: Dec. 13, 2005

(65) Prior Publication Data

US 2007/0195468 A1    Aug. 23, 2007

Related U.S. Application Data

(63) Continuation of application No. 10/732,200, filed on Dec. 10, 2003, now Pat. No. 7,019,949.

(51) Int. Cl.
 *G11B 5/127* (2006.01)
(52) U.S. Cl. .................................. 360/324.11

(58) Field of Classification Search ............. 360/324.11
 See application file for complete search history.

(56) References Cited

U.S. PATENT DOCUMENTS

| 5,974,657 | A | * | 11/1999 | Fox et al. ................. 29/603.08 |
| 6,141,191 | A | | 10/2000 | Lee et al. |
| 6,351,355 | B1 | | 2/2002 | Min et al. |
| 6,519,120 | B1 | | 2/2003 | Lee et al. |
| 6,580,588 | B1 | * | 6/2003 | Gill .......................... 360/324.1 |
| 6,590,749 | B1 | * | 7/2003 | Gill ........................ 360/324.11 |
| 6,643,915 | B2 | * | 11/2003 | Gill .......................... 29/603.14 |

* cited by examiner

*Primary Examiner*—Allen T Cao
(74) *Attorney, Agent, or Firm*—John J. Oskorep, Esq.; Ramdod Nader

(57) ABSTRACT

In one illustrative example, a spin valve (SV) sensor of the self-pinned type includes a free layer; an antiparallel (AP) self-pinned layer structure; and a non-magnetic electrically conductive spacer layer in between the free layer and the AP self-pinned layer structure. The AP self-pinned layer structure includes a first AP pinned layer having a first thickness; a second AP pinned layer having a second thickness; and an antiparallel coupling (APC) layer formed between the first and the second AP pinned layers. The first thickness is slightly greater than the second thickness. Configured as such, the AP pinned layer structure provides for a net magnetic moment that is in the same direction as a magnetic field produced by the sense current flow, which reduces the likelihood of amplitude flip in the SV sensor.

8 Claims, 6 Drawing Sheets

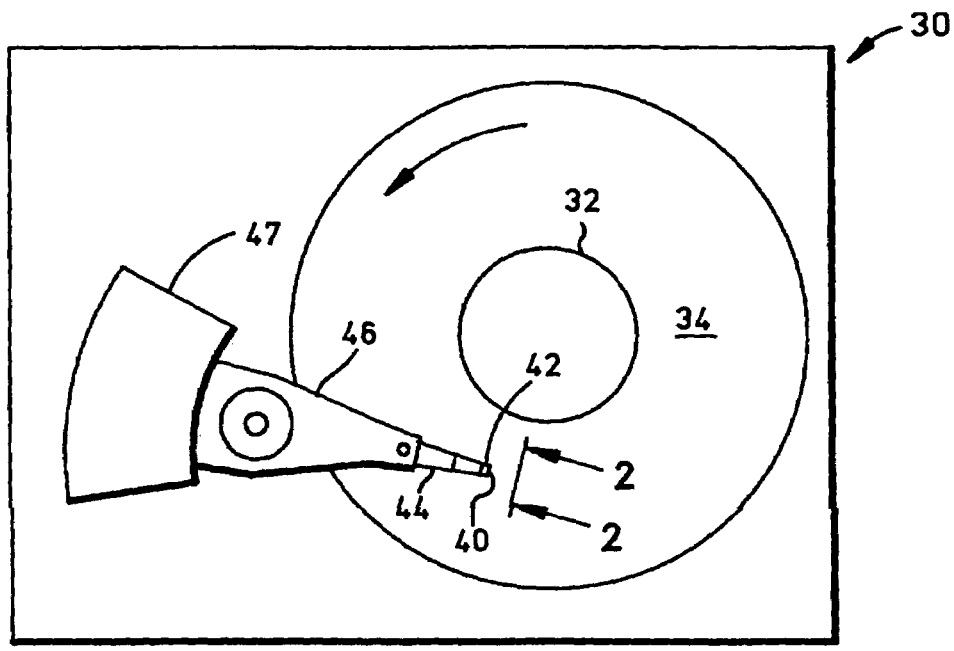
FIG. 1 (PRIOR ART)
FIG. 2 (PRIOR ART)
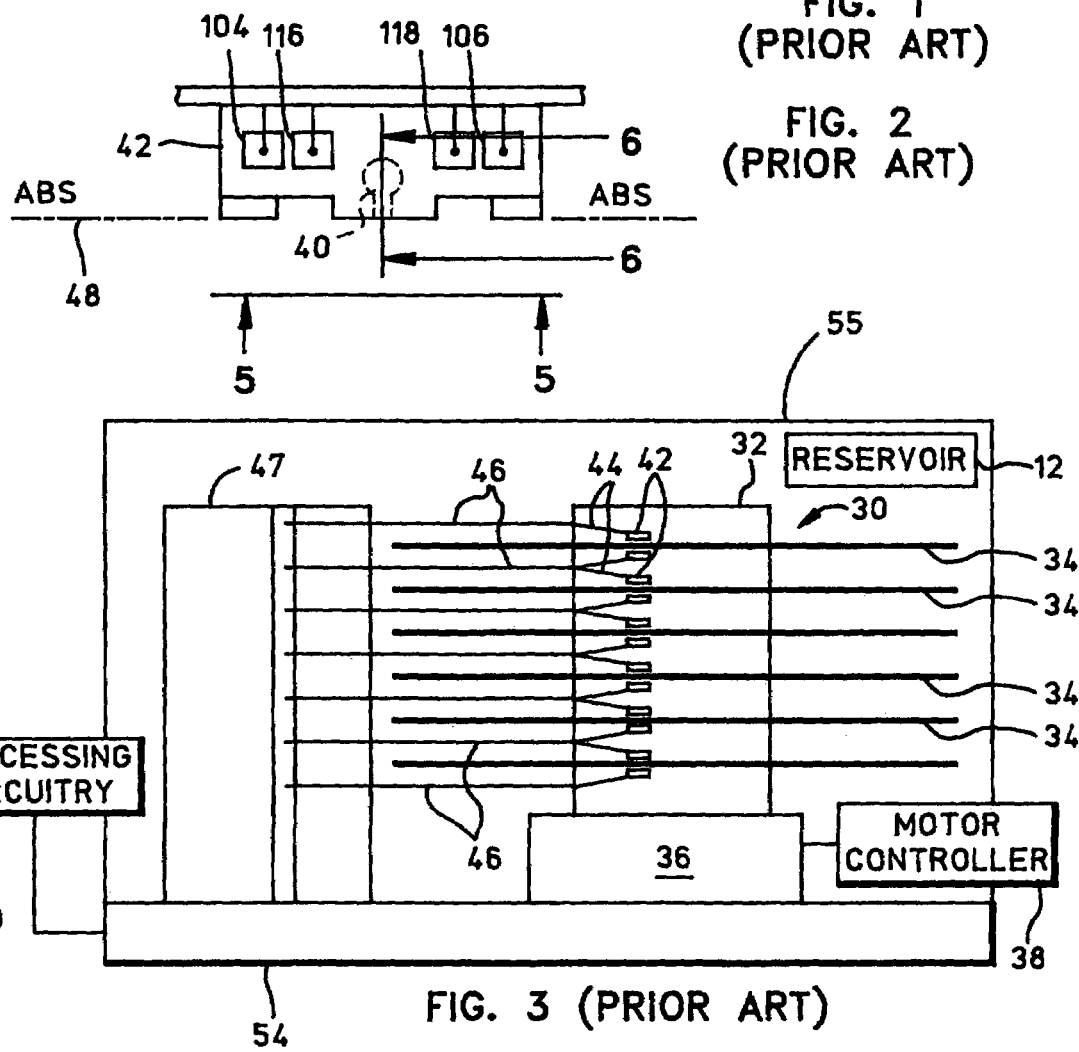
FIG. 3 (PRIOR ART)

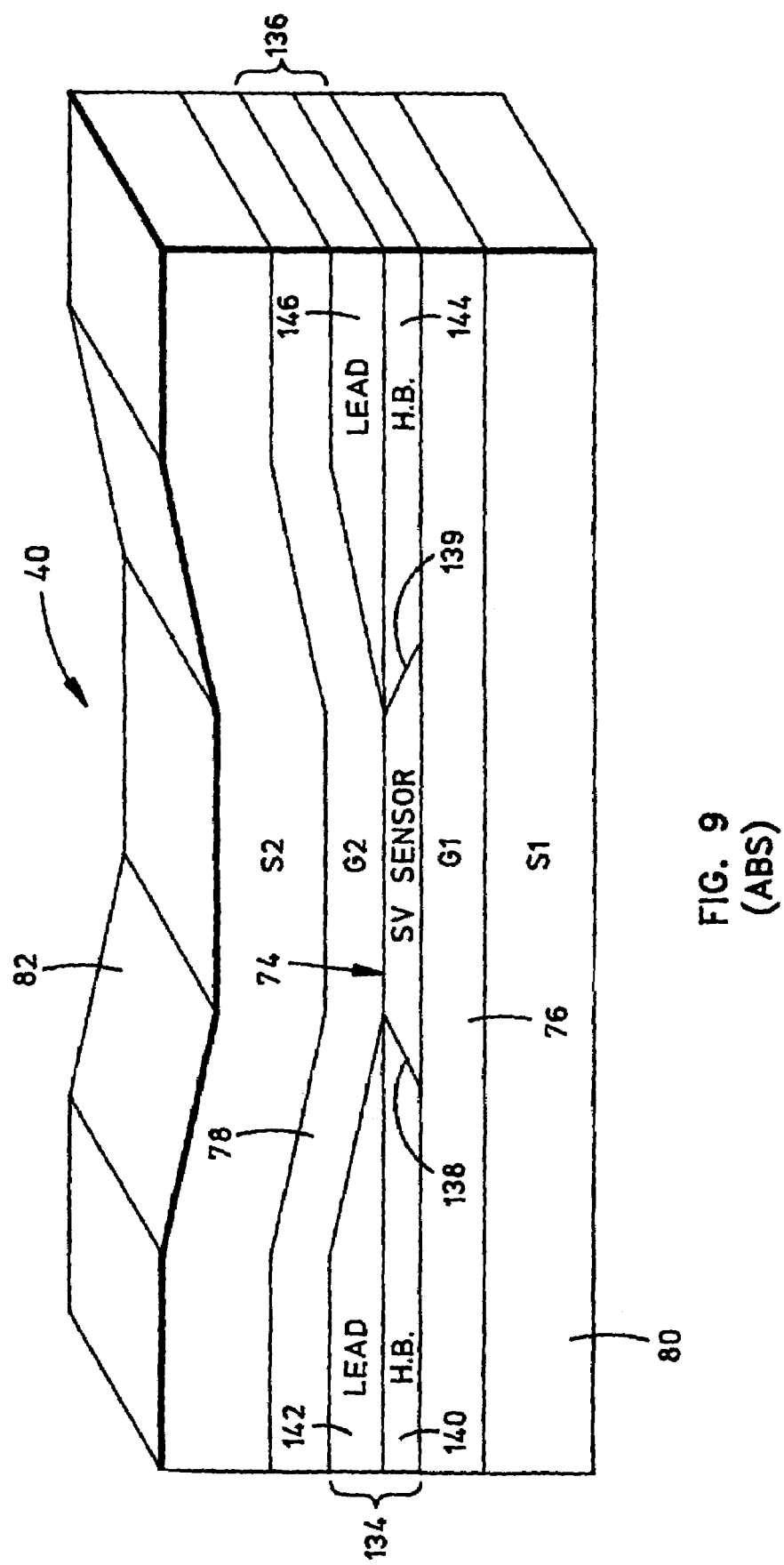
FIG. 9 (ABS)

SELF-PINNED SPIN VALVE SENSOR HAVING ITS FIRST AP PINNED LAYER THICKER THAN ITS SECOND AP PINNED LAYER TO REDUCE THE LIKELIHOOD OF AMPLITUDE FLIP

CROSS-REFERENCE TO RELATED APPLICATION

This patent application is a continuation of and claims priority to U.S. patent application having Ser. No. 10/732,200 and filing date of 10 Dec. 2003 now U.S. Pat. No. 7,019,949.

BACKGROUND OF THE INVENTION

1. Field of the Invention

This invention relates generally to spin valve sensors of magnetic heads, and more particularly to spin valve sensors of the self-pinned type with an AP self-pinned layer structure having a first AP pinned layer that is thicker than a second AP pinned layer to reduce the likelihood of amplitude flip.

2. Description of the Related Art

Computers often include auxiliary memory storage devices having media on which data can be written and from which data can be read for later use. A direct access storage device (e.g. a disk drive) incorporating rotating magnetic disks are commonly used for storing data in magnetic form on the disk surfaces. Data is recorded on concentric, radially spaced tracks on the disk surfaces. Magnetic heads including read sensors are then used to read data from the tracks on the disk surfaces.

In high capacity disk drives, magnetoresistive read (MR) sensors, commonly referred to as MR heads, are the prevailing read sensors because of their capability to read data from a surface of a disk at greater linear densities than thin film inductive heads. An MR sensor detects a magnetic field through the change in the resistance of its MR sensing layer (also referred to as an "MR element") as a function of the strength and direction of the magnetic flux being sensed by the MR layer.

The conventional MR sensor operates on the basis of the anisotropic magnetoresistive (AMR) effect in which the MR element resistance varies as the square of the cosine of the angle between the magnetization of the MR element and the direction of sense current flow through the MR element. Recorded data can be read from a magnetic medium because the external magnetic field from the recorded magnetic medium (the signal field) causes a change in the direction of magnetization in the MR element, which in turn causes a change in resistance in the MR element and a corresponding change in the sensed current or voltage.

Another type of MR sensor is the giant magnetoresistance (GMR) sensor manifesting the GMR effect. In GMR sensors, the resistance of the MR sensing layer varies as a function of the spin-dependent transmission of the conduction electrons between magnetic layers separated by a non-magnetic layer (spacer) and the accompanying spin-dependent scattering which takes place at the interface of the magnetic and non-magnetic layers and within the magnetic layers.

GMR sensors using two layers of ferromagnetic material (e.g. nickel-iron, cobalt-iron, or nickel-iron-cobalt) separated by a layer of nonmagnetic material (e.g. copper) are generally referred to as spin valve (SV) sensors manifesting the SV effect. In an SV sensor, one of the ferromagnetic layers, referred to as the pinned layer, has its magnetization typically pinned by exchange coupling with an antiferromagnetic (AFM) pinning layer (e.g., nickel-oxide, iron-manganese, or platinum-manganese). The pinning field generated by the AFM pinning layer should be greater than demagnetizing fields to ensure that the magnetization direction of the pinned layer remains fixed during application of external fields (e.g. fields from bits recorded on the disk). The magnetization of the other ferromagnetic layer, referred to as the free layer, however, is not fixed and is free to rotate in response to the field from the information recorded on the magnetic medium (the signal field).

The pinned layer may be part of an antiparallel (AP) pinned layer structure which includes an antiparallel coupling (APC) layer formed between first and second AP pinned layers. The first AP pinned layer, for example, may be the layer that is exchange coupled to and pinned by the AFM pinning layer. By strong antiparallel coupling between the first and second AP pinned layers, the magnetic moment of the second AP pinned layer is made antiparallel to the magnetic moment of the first AP pinned layer. In a self-pinned spin valve sensor, however, the first AP pinned layer is not pinned by the AFM layer but is rather "self-pinned". A spin valve sensor of this type relies on magnetostriction of the AP self-pinned layer structure and the air bearing surface (ABS) stress for a self-pinning effect. An AFM pinning layer, which is typically as thick as 150 Angstroms, is no longer necessary for pinning so that a relatively thin sensor can be advantageously fabricated.

There are several characteristics of a spin valve sensor which, if improved, will improve the performance of the magnetic head and increase the data storage capacity of a disk drive. It is generally desirable to increase the magnetoresistive coefficient $\Delta r/R$ of any spin valve sensor without having to substantially increase its thickness. An increase in this spin valve effect (i.e. $\Delta r/R$) equates to higher bit density (bits/square-inch of the rotating magnetic disk) read by the read head. Utilizing a self-pinned structure in a spin valve sensor achieves higher bit densities with its thinner profile and increased sensitivity.

One of the key challenges for self-pinned spin valves, however, has been to improve the pinning field against "flipping". Readback signals from the disk are detected as either a "0" or "1" depending on the polarity of the bits recorded on the disk. However, when an undesirable head-to-disk interaction occurs (due to defects, asperities, bumps, etc.), the sensor experiences compressive or tensile stress which causes the pinning field to flip its orientation. The pinning field may flip its direction either permanently or semi-permanently depending on the severity of the stress. This causes the amplitude of the readback signal to flip (hence the terminology "amplitude flip"), which results in corrupt data.

What are needed are ways in which to improve the pinning field against flipping in self-pinned spin valves.

SUMMARY

In one illustrative embodiment of the invention, a spin valve sensor of the self-pinned type includes a free layer; an antiparallel (AP) self-pinned layer structure; and a non-magnetic electrically conductive spacer layer in between the free layer and the AP self-pinned layer structure. The AP self-pinned layer structure includes a first AP pinned layer; a second AP pinned layer; and an antiparallel coupling (APC) layer formed between the first and the second AP pinned layers. The first AP pinned layer has a thickness that is greater than that of the second AP pinned layer. Such relative thicknesses in the AP self-pinned layer structure provide for a net magnetic moment that is in the same direction as a magnetic field produced by the sense current flow, which reduces the likelihood of amplitude flip in the SV sensor.

BRIEF DESCRIPTION OF THE DRAWINGS

For a fuller understanding of the nature and advantages of the present invention, as well as the preferred mode of use, reference should be made to the following detailed description read in conjunction with the accompanying drawings:

FIG. 1 is a plan view of an exemplary magnetic disk drive;

FIG. 2 is an end view of a slider with a magnetic head of the disk drive as seen in plane 2-2 of FIG. 1;

FIG. 3 is an elevation view of the magnetic disk drive wherein multiple disks and magnetic heads are employed;

FIG. 9 is an enlarged isometric illustration of a read head having a spin valve sensor;

DETAILED DESCRIPTION OF THE PREFERRED EMBODIMENTS

In one illustrative embodiment of the invention, a spin valve sensor of the self-pinned type includes a free layer; an antiparallel (AP) self-pinned layer structure; and a non-magnetic electrically conductive spacer layer in between the free layer and the AP self-pinned layer structure. The AP self-pinned layer structure includes a first AP pinned layer; a second AP pinned layer; and an antiparallel coupling (APC) layer formed between the first and the second AP pinned layers. The first AP pinned layer has a thickness that is greater than that of the second AP pinned layer. Such relative thicknesses in the AP self-pinned layer structure provide for a net magnetic moment that is in the same direction as a magnetic field produced by the sense current flow, which reduces the likelihood of amplitude flip in the SV sensor.

The following description is the best embodiment presently contemplated for carrying out the present invention. This description is made for the purpose of illustrating the general principles of the present invention and is not meant to limit the inventive concepts claimed herein.

Figure 4:
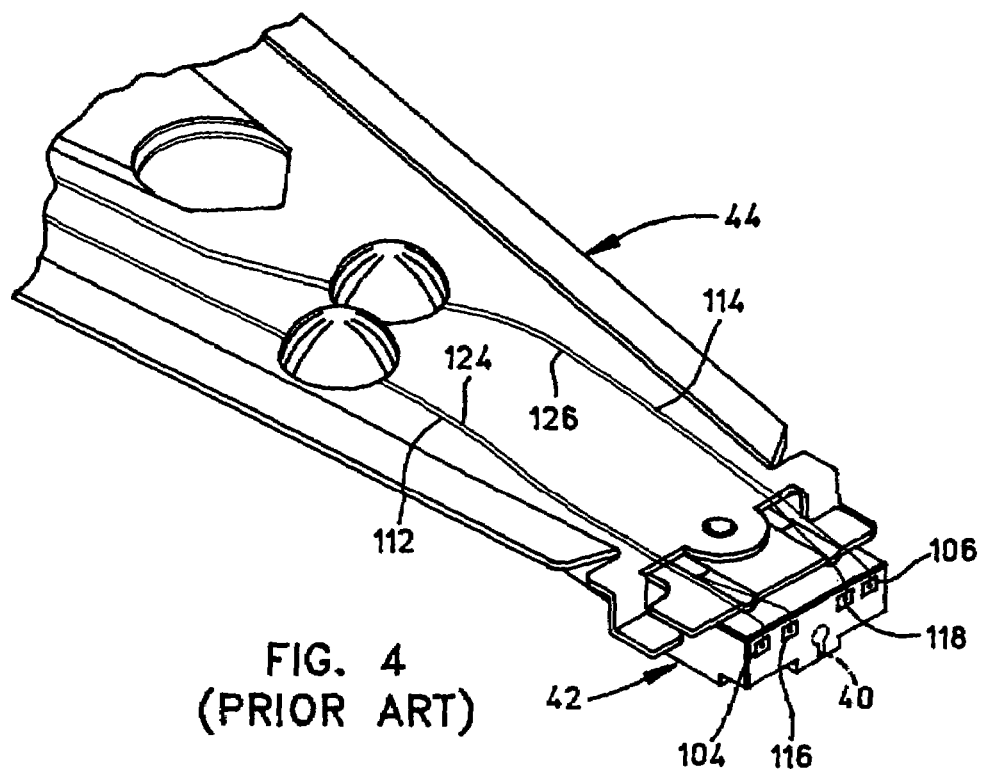
FIG. 4 is an isometric illustration of an exemplary suspension system for supporting the slider and magnetic head.
Figure 5:
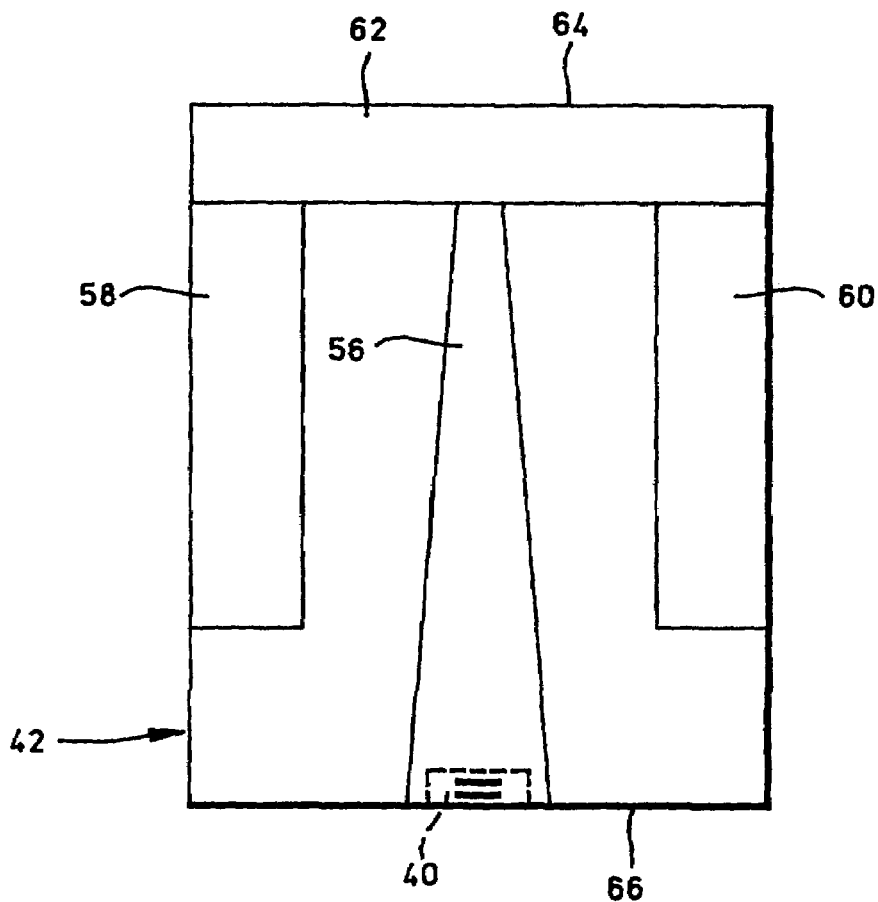
FIG. 5 is an ABS view of the magnetic head taken along plane 5-5 of FIG. 2.

Magnetic Disk Drive. Referring now to the drawings wherein like reference numerals designate like or similar parts throughout the several views, FIGS. 1-3 illustrate a magnetic disk drive 30. Disk drive 30 includes a spindle 32 that supports and rotates a magnetic disk 34. Spindle 32 is rotated by a spindle motor 36 that is controlled by a motor controller 38. A slider 42 includes a combined read and write magnetic head 40 and is supported by a suspension 44 and actuator arm 46 that is rotatably positioned by an actuator 47. A plurality of disks, sliders, and suspensions may be employed in a large capacity direct access storage device (DASD) as shown in FIG. 3. Suspension 44 and actuator arm 46 are moved by actuator 47 to position slider 42 so that magnetic head 40 is in a transducing relationship with a surface of magnetic disk 34. When disk 34 is rotated by spindle motor 36, slider 42 is supported on a thin (typically, 0.05 µm) cushion of air (air bearing) between the surface of disk 34 and an air bearing surface (ABS) 48. Magnetic head 40 may then be employed for writing information to multiple circular tracks on the surface of disk 34, as well as for reading information therefrom. Processing circuitry 50 exchanges signals, representing such information, with head 40, provides spindle motor drive signals for rotating magnetic disk 34, and provides control signals to actuator 47 for moving slider 42 to various tracks. In FIG. 4, slider 42 is shown mounted to a suspension 44. The components described hereinabove may be mounted on a frame 54 of a housing 55, as shown in FIG. 3. FIG. 5 is an ABS view of slider 42 and magnetic head 40. Slider 42 has a center rail 56 that supports magnetic head 40, and side rails 58 and 60. Rails 56, 58 and 60 extend from a cross rail 62. With respect to rotation of magnetic disk 34, cross rail 62 is at a. leading edge 64 of slider 42 and magnetic head 40 is at a trailing edge 66 of slider 42.

Figure 6:
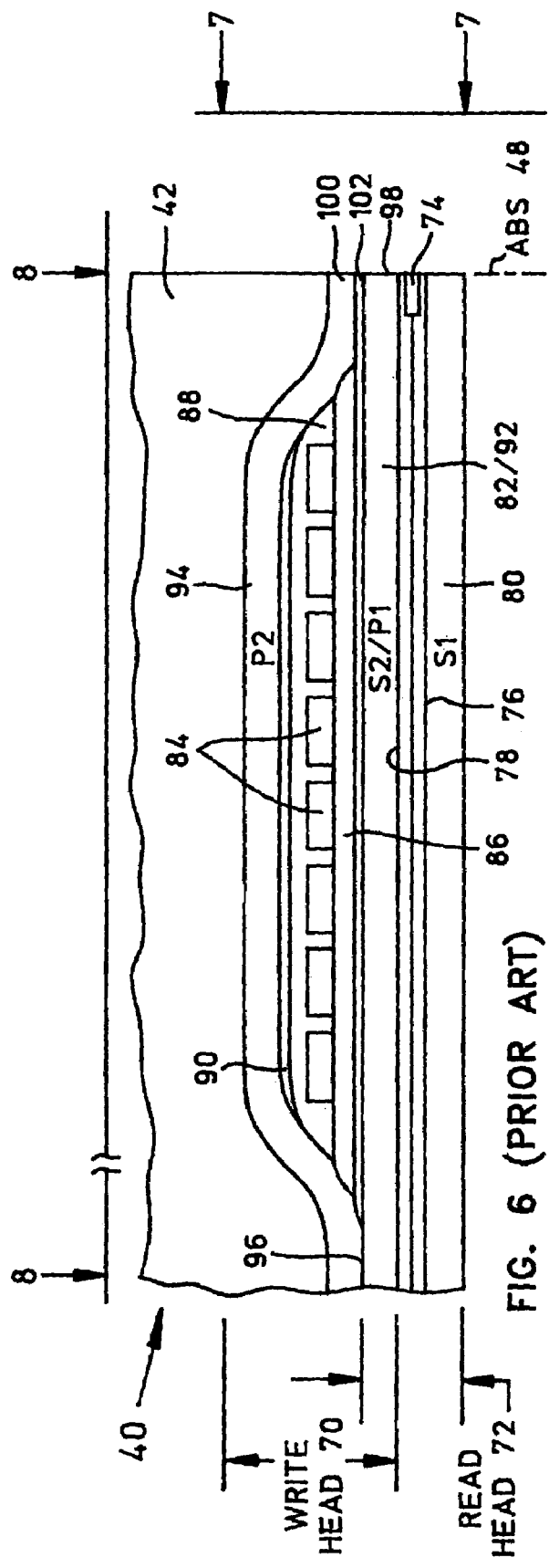
FIG. 6 is a partial view of the slider and a merged magnetic head as seen in plane 6-6 of FIG. 2.
Figure 7:
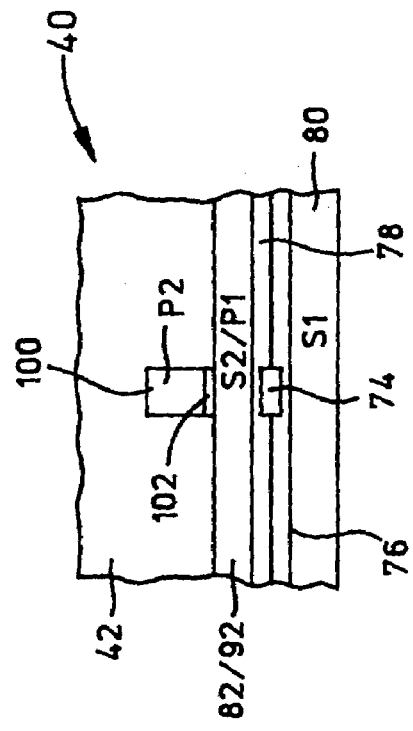
FIG. 7 is a partial ABS view of the slider taken along plane 7-7 of FIG. 6 to show the read and write elements of the merged magnetic head.

FIG. 6 is a side cross-sectional elevation view of a merged magnetic head 40, which includes a write head portion 70 and a read head portion 72. Read head portion 72 includes a giant magnetoresistive (GMR) read head which utilizes a spin valve sensor 74 of the present invention. FIG. 7 is an ABS view of FIG. 6. Spin valve sensor 74 is sandwiched between nonmagnetic electrically insulative first and second read gap layers 76 and 78, and read gap layers 76 and 78 are sandwiched between ferromagnetic first and second shield layers 80 and 82. In response to external magnetic fields, the resistance of spin valve sensor 74 changes. A sense current ($I_S$) conducted through the sensor causes these resistance changes to be manifested as potential changes. These potential changes are then processed as readback signals by processing circuitry 50 shown in FIG. 3.

Figure 8:
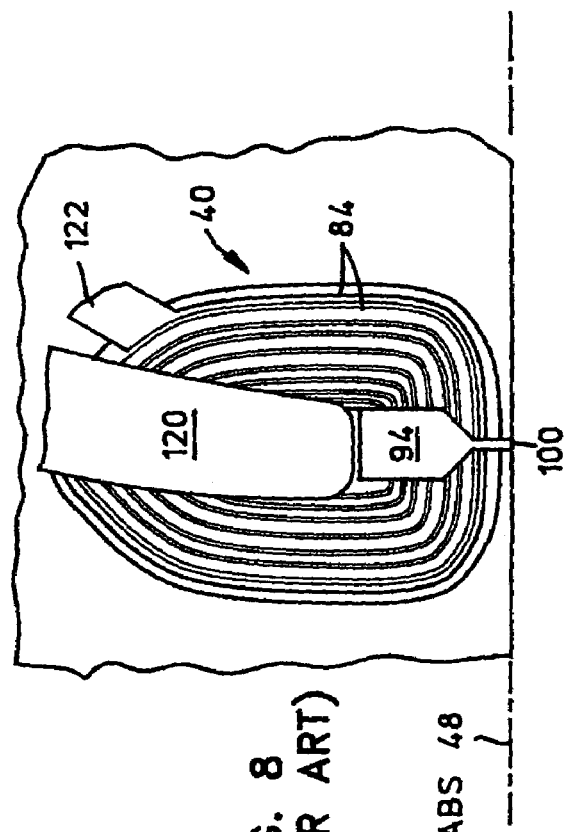
FIG. 8 is a view taken along plane 8-8 of FIG. 6 with all material above the coil layer and leads removed.

Write head portion 70 of magnetic head 40 includes a coil layer 84 sandwiched between first and second insulation layers 86 and 88. A third insulation layer 90 may be employed for planarizing the head to eliminate ripples in the second insulation layer caused by coil layer 84. The first, second and third insulation layers are referred to in the art as an "insulation stack". Coil layer 84 and first, second and third insulation layers 86, 88 and 90 are sandwiched between first and second pole piece layers 92 and 94. First and second pole piece layers 92 and 94 are magnetically coupled at a back gap 96 and have first and second pole tips 98 and 100 which are separated by a write gap layer 102 at the ABS. Since second shield layer 82 and first pole piece layer 92 are a common layer, this head is known as a merged. head. In a piggyback head an insulation layer is located between a second shield layer and a first pole piece layer. As shown in FIGS. 2 and 4, first and second solder connections 104 and 106 connect leads from spin valve sensor 74 to leads 112 and 114 on suspension 44, and third and fourth solder connections 116 and 118 connect leads 120 and 122 from the coil 84 (see FIG. 8) to leads 124 and 126 on suspension 44.

FIG. 9 is an enlarged isometric ABS illustration of read head 40 shown in FIG. 7 which includes spin valve sensor 74. First and second hard bias and lead layers 134 and 136 are connected to first and second side edges 138 and 139 of spin valve sensor 74. This connection is known in the art as a contiguous junction and is fully described in commonly assigned U.S. Pat. No. 5,018,037 which is incorporated by reference herein. First hard bias and lead layers 134 include a first hard bias layer 140 and a first lead layer 142, and second hard bias and lead layers 136 include a second hard bias layer 144 and a second lead layer 146. Hard bias layers 140 and 144 cause magnetic fields to extend longitudinally through spin valve sensor 74 for stabilizing the magnetic domains therein.

Spin valve sensor 74 and first and second hard bias and lead layers 134 and 136 are located between the nonmagnetic electrically insulative first and second read gap layers 76 and 78. First and second read gap layers 76 and 78 are, in turn, located between ferromagnetic first and second shield layers 80 and 82.

Figure 10:
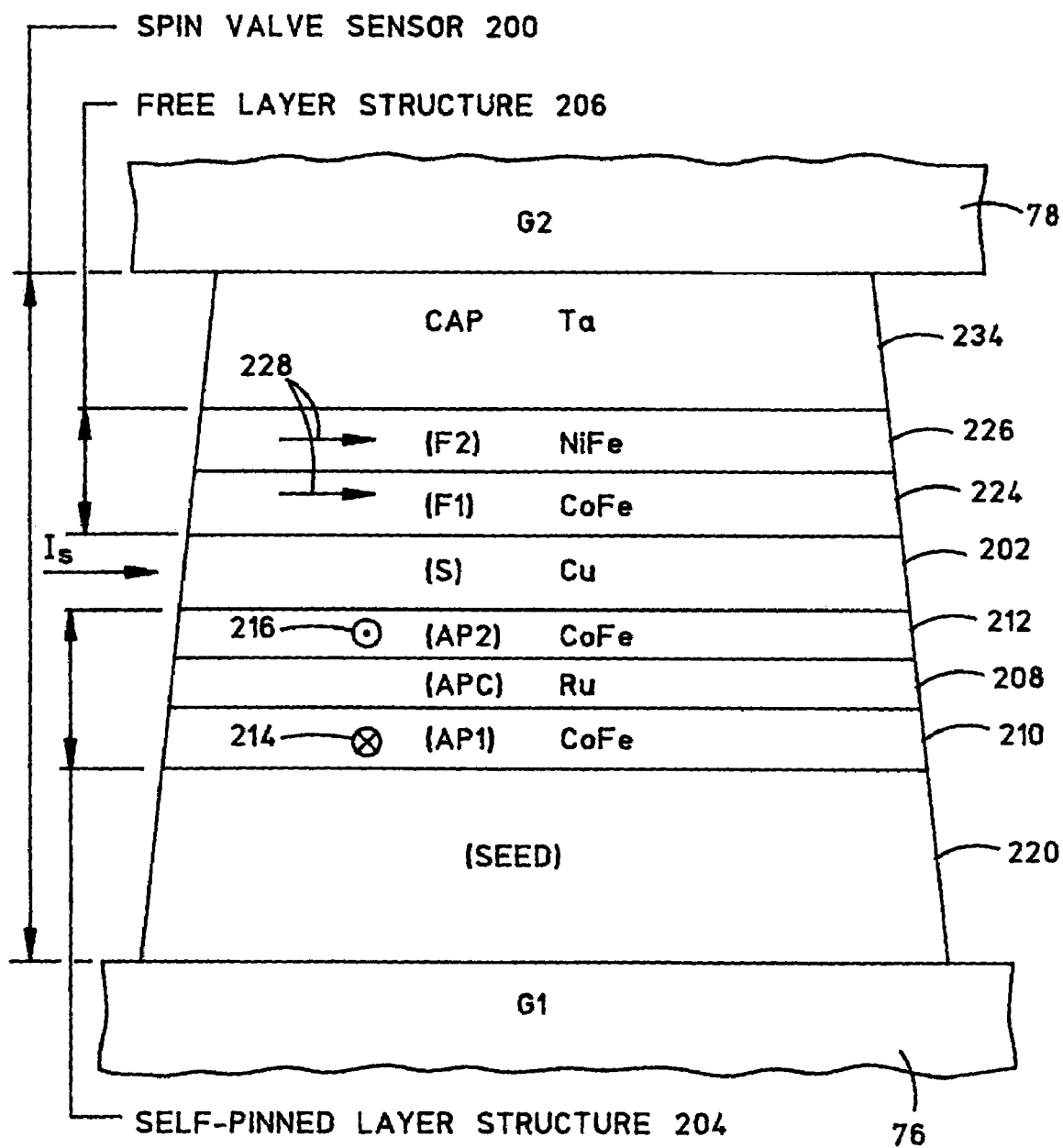
FIG. 10 is an ABS illustration of a typical multi-layer structure of a spin valve sensor of the self-pinned type.

FIG. 10 shows an ABS illustration of a typical multi-layered structure of a spin valve sensor 200 of the self-pinned type located between first and second read gap layers 76 and 78. Spin valve sensor 200 includes a non-magnetic electrically conductive spacer (S) layer 202 which is located between an antiparallel (AP) self-pinned layer structure 204 and a free layer structure 206. AP self-pinned layer structure 204 includes first and second ferromagnetic AP pinned layers (AP1) and (AP2) 210 and 212 which are separated by an antiparallel coupling (APC) layer 208. Second AP pinned layer 212 is located underneath and adjacent to spacer layer 202, whereas first AP pinned layer 210 is located over and adjacent to a seed layer 220. Seed layer 220 is provided between first read gap layer 76 and AP self-pinned layer structure 204 for promoting a desirable texture of the layers deposited thereon. Free layer structure 206 includes first and second free ferromagnetic layers (F1) and (F2) 224 and 226, with first free layer 224 interfacing with spacer layer 202. A cap or capping layer 234 is formed over free layer structure 206 for protecting the sensor. Free layer structure 206 has a magnetic moment 228 which is oriented parallel to the ABS and to the major planes of the layers in a direction from right to left, or from left to right, as shown in FIG. 10.

No antiferromagnetic (AFM) pinning layer in FIG. 10 is necessary for pinning within spin valve sensor 200. Note that, in a non-self-pinned type application, first AP pinned layer 210 is exchange-coupled to an AFM pinning layer which pins a magnetic moment 214 of first AP pinned layer 210 perpendicular to the ABS in a direction out of or into spin valve sensor 200, as shown in FIG. 10. By strong antiparallel coupling between first and second AP pinned layers 210 and 212, a magnetic moment 216 of second AP pinned layer 212 is antiparallel to magnetic moment 214. A self-pinned spin valve sensor, however, relies on magnetostriction of AP self-pinned layer structure 204 as well as ABS stress for a self-pinning effect. An AFM pinning layer, which is typically as thick as 150 Angstroms, is not necessary for pinning and therefore a relatively thin sensor can be fabricated.

When a signal field from the rotating magnetic disk rotates magnetic moment 228 into the sensor (downwards into paper), magnetic moments 228 and 216 become more antiparallel which increases the resistance of the sensor. When a signal field rotates magnetic moment 228 out of the sensor (upwards out of the paper), magnetic moments 228 and 216 become more parallel which reduces the resistance of sensor 200 to the sense current. These resistance changes are processed as playback signals by processing circuitry (i.e. processing circuitry 50 of FIG. 3).

The following materials may be utilized in the multilayered spin valve sensor 200 of FIG. 10. Seed layer 220 is a multi-layered seed layer structure which includes alumina ($Al_2O_3$), nickel-iron-chromium (NiFeCr), nickel-iron (NiFe), and platinum-manganese (PtMn), respectively, from bottom to top; AP pinned layers 210 and 212 of AP self-pinned layer structure 204 are made of cobalt-iron (CoFe); APC layer 208 is made of ruthenium (Ru); first and second free layers 224 and 226 are made of cobalt-iron (CoFe) and nickel-iron (NiFe), respectively; spacer layer 202 is made of copper (Cu); and capping layer 234 is made of tantalum (Ta). An additional copper (Cu) layer may be formed over second free layer 226 for reflecting conduction electrons back into the mean free path of conduction electrons.

Thicknesses of particular materials for spin valve sensor 200 may be 30 Angstroms of $Al_2O_3$ for the first (bottom) seed layer, 30 Angstroms of NiFeCr for the second seed layer, 10 Angstroms of NiFe for the third seed layer, and 30 Angstroms of PtMn for the fourth (top) seed layer; various thicknesses X of $Co_{90}Fe_{10}$ for first AP pinned layer 210; 8 Angstroms of Ru for APC layer 208; various thicknesses Z of $Co_{90}Fe_{10}$ for second AP pinned layer 212; 20 Angstroms of Cu for spacer layer 202; 15 Angstroms of $Co_{90}Fe_{10}$ for first free layer 224; 15 Angstroms of $Ni_{83}Fe_{17}$ for second free layer 226; and 40 Angstroms of Ta for capping layer 234. The thickness of second AP pinned layer 212 is formed to be slightly greater than the thickness of first AP pinned layer 210. For example, the thickness of second AP pinned layer 212 may be about 18 Angstroms and the thickness of first AP pinned layer 210 may be about 15 Angstroms.

As described earlier, if sensor 200 were not a self-pinned type sensor, an AFM pinning layer of PtMn having a thickness of 150 Angstroms would need to be formed adjacent pinned layer structure 204 for pinning the magnetic moment 214 of first AP pinned layer 210. Note that the thickness of the fourth (top) seed layer of PtMn at 30 Angstroms is not sufficient to provide any pinning effect, which quickly decreases when the PtMn is at or below 75 Angstroms and is negligible at or below 50 Angstroms. Preferably, this fourth top seed layer of PtMn is between 5-75 Angstroms.

Utilizing a self-pinned structure in a spin valve sensor achieves higher bit densities with its thinner profile and increased sensitivity. One of the key challenges for self-pinned spin valves, however, has been to improve the pinning field against "flipping". Readback signals from the disk are detected as either a "0" or "1" depending on the polarity of the bits recorded on the disk. However, when an undesirable head-to-disk interaction occurs (due to asperities, bumps, defects, etc.), the sensor experiences compressive or tensile stress which causes the pinning field to flip its direction. The pinning field may flip its direction either permanently or semi-permanently depending on the severity of the stress. This causes the amplitude of the readback signal to flip, which results in corrupt data.

It has been identified that, since second AP pinned layer 1106 is made thicker than first AP pinned layer 1104, the net magnetic moment of AP pinned layer structure 204 is in a direction opposite that of a magnetic field produced by the sense current (which flows from left to right in FIG. 10). Note that, the directions of the sense current and magnetic moments of the pinned layers are orthogonal; the field that the sense current generates is parallel (or anti-parallel) to the AP pinned layers. With such configuration, the pinning field is relatively unstable (i.e. it is more likely to "flip") which is especially apparent during increased operating temperatures of the spin valve sensor. It has been shown that the pinning field can indeed rotate when a large positive current is applied to spin valve sensor 200.

A spin valve sensor of the present invention, however, includes an AP self-pinned layer structure which has a first AP pinned layer that is slightly thicker than its second AP pinned layer. Such relative thicknesses in the AP self-pinned layer structure provide for a net magnetic moment that is in the same direction as the magnetic field produced by the sense current flow, which substantially reduces the likelihood that the pinning field will flip its direction. The spin valve sensor of the present invention is more thermally stable, as it is less likely that the pinning field will flip its direction during increased operating temperatures of the sensor.

Figure 11:
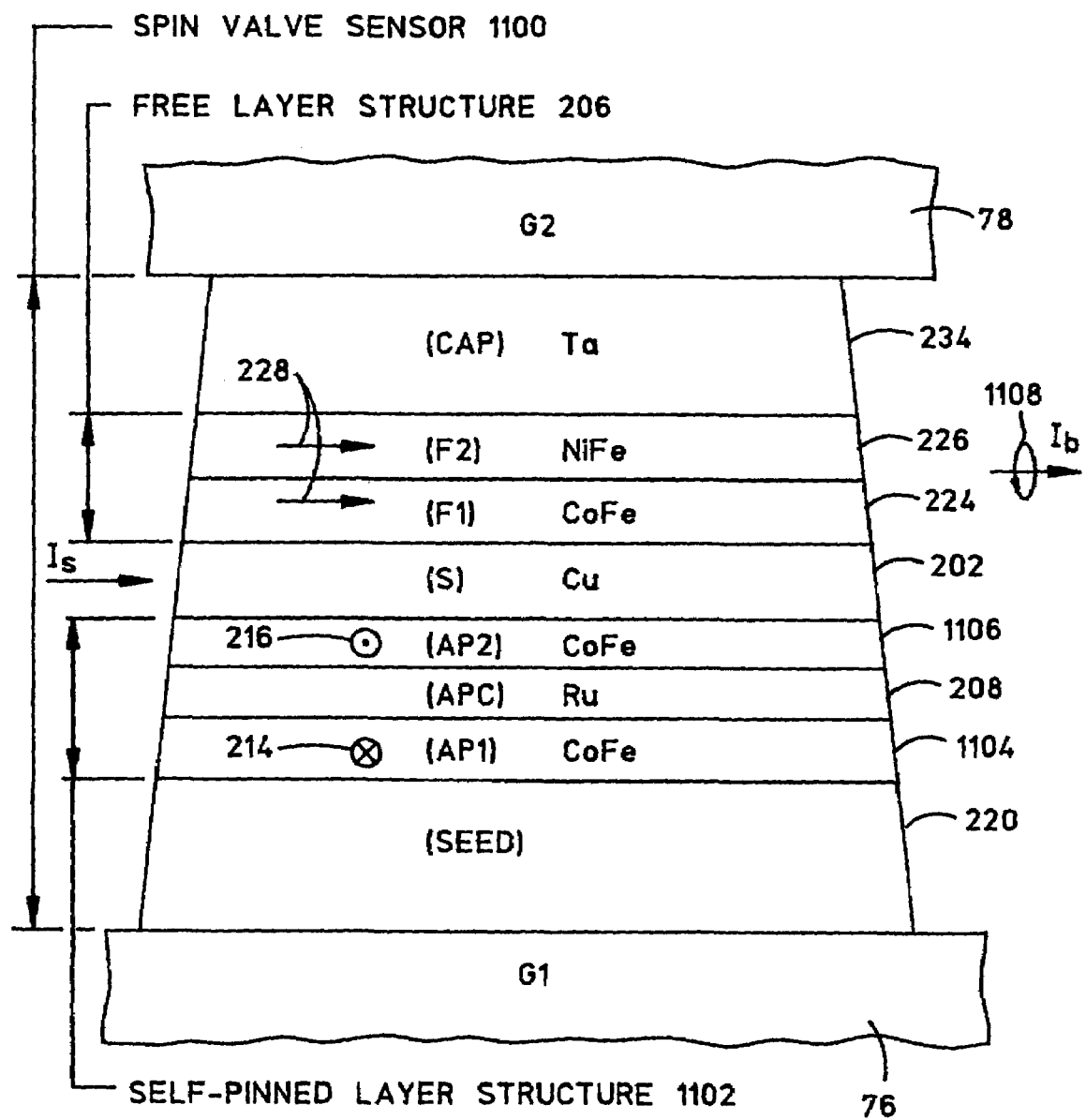
FIG. 11 is an ABS illustration of a multi-layer structure of a spin valve sensor of the self-pinned type according to the present invention.

FIG. 11 is an ABS illustration of a multi-layer structure of a spin valve sensor 1100 of the self-pinned type in accordance with the present invention. Spin valve sensor 1100 of FIG. 11 is similar to that shown and described in relation to FIG. 10, except that spin valve sensor 1100 includes a different AP self-pinned layer structure 1102. Specifically, AP self-pinned layer structure 1102 includes a first AP pinned layer 1104 having a first thickness and a second AP pinned layer 1106 having a second thickness, where the first thickness is greater than the second thickness. Preferably, the difference between the first and the second thicknesses is between about 1-5 Angstroms. With the first and the second thicknesses each being somewhere between about 10-20 Angstroms, for example, the percentage difference between first and second AP pinned layers 1104 and 1106 may be between about 5-20%. As described above, these relative thicknesses in AP pinned layers provide for a net magnetic moment in a direction 1108 which is the same as that of a magnetic field produced by the sense current flow. This substantially reduces the likelihood that the pinning field will flip its direction, which has been confirmed by internal testing. Spin valve sensor 1100 is more thermally stable, as it less likely that the pinning field will flip its direction during increased operating temperatures of sensor 1100.

Table 1 below provides thickness data (in Angstroms) from two different test runs, SV#1 and SV#2, for self-pinned spin valve sensors. In SV#1, the second, AP pinned layer was made thicker than the first AP pinned layer as is conventional. For SV#1, the pinning field was shown to flip upon application of a relatively large sense current. In SV#2, the first AP pinned layer was made thicker than the second AP pinned layer in accordance with the present invention. For SV#2, the pinning field did not flip upon application of the same relatively large sense current.

TABLE 1

Thickness data from two different SV structures, where SV #1 structure is formed with its first AP pinned layer thicker than its second AP pinned layer and SV #2 stucture is formed with its second AP pinned layer thicker than its first AP pinned layer.

| LAYER | SV #1 | SV #2 |
|---|---|---|
| Ta | 40 | 40 |
| NiFe | 25 | 25 |
| CoFe | 15 | 15 |
| Cu—O | 20 | 20 |
| CoFe | 17 | 17 |
| Ru | 8 | 8 |
| CoFe | 13 | 20 |
| PtMn | 30 | 30 |
| NiFe | 8 | 8 |
| NiFeCr | 25 | 25 |
| $Al_2O_3$ | 30 | 30 |

Final Comments. As described herein, a spin valve sensor of the self-pinned type includes a free layer; an antiparallel (AP) self-pinned layer structure; and a non-magnetic electrically conductive spacer layer in between the free layer and the AP self-pinned layer structure. The AP self-pinned layer structure includes a first AP pinned layer; a second AP pinned layer; and an antiparallel coupling (APC) layer formed between the first and the second AP pinned layers. The first AP pinned layer has a thickness that is greater than that of the second AP pinned layer. Such relative thicknesses in the AP self-pinned layer structure provide for a net magnetic moment that is in the same direction as a magnetic field produced by the sense current flow, which reduces the likelihood of amplitude flip in the SV sensor.

Also as described, a disk drive of the present invention includes a housing; a magnetic disk rotatably supported in the housing; a magnetic head; a support mounted in the housing for supporting the magnetic head so as to be in a transducing relationship with the magnetic disk; a spindle motor for rotating the magnetic disk; an actuator positions with respect to said magnetic disk; and a processor connected to the magnetic head, to the spindle motor, and to the actuator for exchanging signals with the magnetic head for controlling movement of the magnetic disk and for controlling the position of the magnetic head. The magnetic head includes a spin valve sensor which comprises a free layer; an antiparallel (AP) self-pinned layer structure; and a non-magnetic electrically conductive spacer layer in between the free layer and the AP self-pinned layer structure. The AP self-pinned layer structure includes a first AP pinned layer having a first thickness; a second AP pinned layer having a second thickness; an antiparallel coupling (APC) layer formed between the first and the second AP pinned layers; wherein the first thickness of the first AP pinned layer is greater than the second thickness of the second AP pinned layer. Such relative thicknesses in the AP self-pinned layer structure provide for a net magnetic moment that is in the same direction as the magnetic field produced by the sense current flow, which reduces the likelihood of amplitude flip in the SV sensor.

It is to be understood that the above is merely a description of preferred embodiments of the invention and that various changes, alterations, and variations may be made without departing from the true spirit and scope of the invention as set for in the appended claims. Although the specific sensors described herein have been bottom-pinned type spin valves, one skilled in the art will understand that it is applicable to top-pinned type spin valves and others. Few if any of the terms or phrases in the specification and claims have been given any special meaning different from their plain language meaning, and therefore the specification is not to be used to define terms in an unduly narrow sense.

What is claimed is:

1. A method for use in reading data from a magnetic storage medium with use of a read sensor, the method comprising:

providing a read sensor having an antiparallel (AP) self-pinned layer structure for magnetically biasing a free layer in the read sensor and a spacer layer in between the AP self-pinned layer structure and the free layer, the AP self-pinned layer structure including a first AP pinned layer, a second AP pinned layer formed in closer proximity to the spacer layer than the first AP pinned layer, and an antiparallel coupling (APC) layer formed between the first and the second AP pinned layers, the read sensor being without an antiferromagnetic (AFM) layer for pinning the AP self-pinned layer structure which is instead self-pinned by magnetostriction and air bearing surface stress, and wherein a thickness of the first AP pinned layer is greater than a thickness of the second AP pinned layer to produce a net magnetic moment of the AP self-pinned layer structure in a first direction; and causing a sense current to be driven through the read sensor to produce a magnetic field in the same first direction of the net magnetic moment, which reduces the likelihood of amplitude flip associated with the AP self-pinned layer structure.

2. The method of claim 1, wherein the read sensor is provided with the thickness of the first AP pinned layer being about 1-5 Angstroms greater than the thickness of the second AP pinned layer.

3. The method of claim 1, wherein the read sensor is provided with the thickness of the first AP pinned layer being about 5-20% greater than the thickness of the second AP pinned layer.

4. The method of claim 1, wherein the read sensor is provided as a spin valve sensor.

5. A method for use in operating a magnetic storage device for reading data from a magnetic storage medium, the method comprising:

provided a magnetic storage device having a magnetic storage medium and a magnetic head with a read sensor for reading data from the magnetic storage medium, the read sensor having an antiparallel (AP) self-pinned layer structure for magnetically biasing a free layer in the read sensor and a spacer layer in between the AP self-pinned layer structure and the free layer, the AP self-pinned layer structure including a first AP pinned layer, a second AP pinned layer formed in closer proximity to the spacer layer than the first AP pinned layer, and an antiparallel coupling (APC) layer formed between the first and the second AP pinned layers, the read sensor being without an antiferromagnetic (AFM) layer for Pinning the AP self-pinned layer structure which is instead self-pinned by magnetostriction and air bearing surface (ABS) stress, wherein a thickness of the first AP pinned layer is greater than a thickness of the second AP pinned layer to produce a net magnetic moment of the AP self-pinned layer structure in a first direction; and causing a sense current to be driven through the read sensor to produce a magnetic field in the same first direction of the net magnetic moment, which reduces the likelihood of amplitude flip associated with the AP self-pinned layer structure.

6. The method of claim 5, wherein the magnetic storage device is provided with the read sensor having the thickness of the first AP pinned layer being about 1-5 Angstroms greater than the thickness of the second AP pinned layer.

7. The method of claim 5, wherein the magnetic storage device is provided with the read sensor having the thickness of the first AP pinned layer being about 5-20% greater than the thickness of the second AP pinned layer.

8. The method of claim 5, wherein the magnetic storage device is provided with the read sensor which comprises a spin valve sensor.

* * * * *